(12) United States Patent
O'Quin et al.

(10) Patent No.: US 6,357,767 B1
(45) Date of Patent: Mar. 19, 2002

(54) STATIC-DISSIPATIVE MEMBER FOR WHEELED CONVEYANCE

(75) Inventors: Taft O'Quin, Inola; Leslee Bottoms, Wagoner, both of OK (US)

(73) Assignee: Unarco Industries, Inc., Wagoner, OK (US)

(*) Notice: Subject to any disclaimer, the term of this patent is extended or adjusted under 35 U.S.C. 154(b) by 0 days.

(21) Appl. No.: 09/685,707

(22) Filed: Oct. 10, 2000

(51) Int. Cl.⁷ .................................................. B62B 1/00
(52) U.S. Cl. ..................... 280/79.11; 361/217; 361/219; 361/222
(58) Field of Search .............................. 280/79.11, 79.4; 361/212, 216, 217, 219, 220, 222

(56) References Cited

U.S. PATENT DOCUMENTS

| | | | | |
|---|---|---|---|---|
| 1,920,889 A | * | 8/1933 | Pullen | 175/264 |
| 4,321,653 A | * | 3/1982 | Takahashi | 361/219 |
| 4,697,300 A | * | 10/1987 | Warlop | 15/327 R |
| 4,866,565 A | * | 9/1989 | Wray | 361/215 |

OTHER PUBLICATIONS

"Existing Drag Chain", undated sketch of admitted prior art.

* cited by examiner

Primary Examiner—Christpher P. Schwartz
Assistant Examiner—C. T. Bartz
(74) Attorney, Agent, or Firm—Rocky, Milnamow & Katz, Ltd.

(57) ABSTRACT

A wheeled conveyance, such as a shopping cart, a luggage cart, a utility cart, a wheel chair, a gurney, or a tricycle has a metal chassis and wheels, which support the metal chassis above a supporting surface, such as a floor surface, and which may isolate the metal chassis electrically from the supporting surface. The metal chassis is grounded to the supporting surface by an elongate, flexible member, which is made from a non-metallic, static-dissipative material, such as a polyvinyl chloride, and which is arranged to drag along the supporting surface when the wheeled conveyance is moved along the supporting surface. Each wheel has an axle, on which such wheel is rotatable, and the elongate member can be mechanically and electrically connected to the axle of one of the wheels.

7 Claims, 2 Drawing Sheets

STATIC-DISSIPATIVE MEMBER FOR WHEELED CONVEYANCE

TECHNICAL FIELD OF THE INVENTION

This invention pertains generally to a wheeled conveyance, such as a shopping cart, a luggage cart, a utility cart, a wheel chair, a gurney, or a tricycle, of a type having a metal chassis and wheels and designed to be manually moved by pushing, pulling, or pedaling along a supporting surface. This invention pertains specifically to an improved, static-dissipative member, which grounds the metal chassis to the supporting surface.

BACKGROUND OF THE INVENTION

When a wheeled conveyance of the type noted above is moved along a supporting surface, such as a floor, the wheels may isolate the wheeled chassis electrically from the supporting surface. Thus, static discharges can occur, which may be bothersome if the wheeled conveyance is a shopping cart, a luggage cart, or a utility cart, but which may be hazardous if the wheeled conveyance is a gurney bearing a patient in a medical facility.

To minimize static discharges, it is known to use conductive, carbon-filled, or metal powder-filled polymers to make surface-engaging tires of the wheels. However, it is understood that wheels having surface-engaging tires made from such polymers, when dirty after extended periods of heavy use, nonetheless may isolate the wheeled chassis of a wheeled conveyance of the type noted above from the supporting surface.

Furthermore, it is known to use a metal chain to ground the wheeled chassis of a wheeled conveyance of the type noted above from the supporting surface. The metal chain is hung from the wheeled chassis so as to drag along the supporting surface when the wheeled conveyance is moved along the supporting surface. However, a metal chain is disfavored because a metal chain tends to damage the supporting surface, particularly if the supporting surface is a finished surface of a vinyl, wooden, or laminated floor.

SUMMARY OF THE INVENTION

This invention is applicable to a wheeled conveyance of a type designed to be moved by pushing, pulling, or pedaling along a supporting surface. As examples, which are not limiting, the wheeled conveyance may be a shopping cart, a luggage cart, a utility cart, a wheel chair, a gurney, or a tricycle. As examples, which are not limiting, the supporting surface may be a finished surface of a vinyl, wooden, or laminated floor.

The wheeled chassis has a metal chassis and has wheels, which support the metal chassis above the supporting surface, and which may isolate the metal chassis electrically from the supporting surface. This invention is applicable whether or not a conductive, carbon-filled, or metal powder-filled polymer is used to make surface-engaging tires of the wheels. The metal chassis is grounded to the supporting surface by an elongate member, which is arranged to drag along the supporting surface when the wheeled conveyance is moved along the supporting surface.

As improved by this invention, the elongate member is made from a non-metallic, static-dissipative material, at least where the elongate member drags along the supporting surface. Preferably, the non-metallic, static-dissipative material is a polymeric material, such as polyvinyl chloride. Preferably, the elongate member is a tubular, flexible member.

In a preferred embodiment of this invention, if each wheel of the wheeled conveyance has an axle, about which such wheel is rotatable, the elongate member is mounted mechanically and electrically to the axle of one of the wheels. This invention is applicable whether each wheel has its own axle or whether paired wheels have a common axle.

Furthermore, as contemplated by this invention, mounting of the elongate member electrically and mechanically to the axle of one of the wheels may be also applicable if the elongate member is a metal chain.

DETAILED DESCRIPTION OF THE INVENTION

Figure 1:
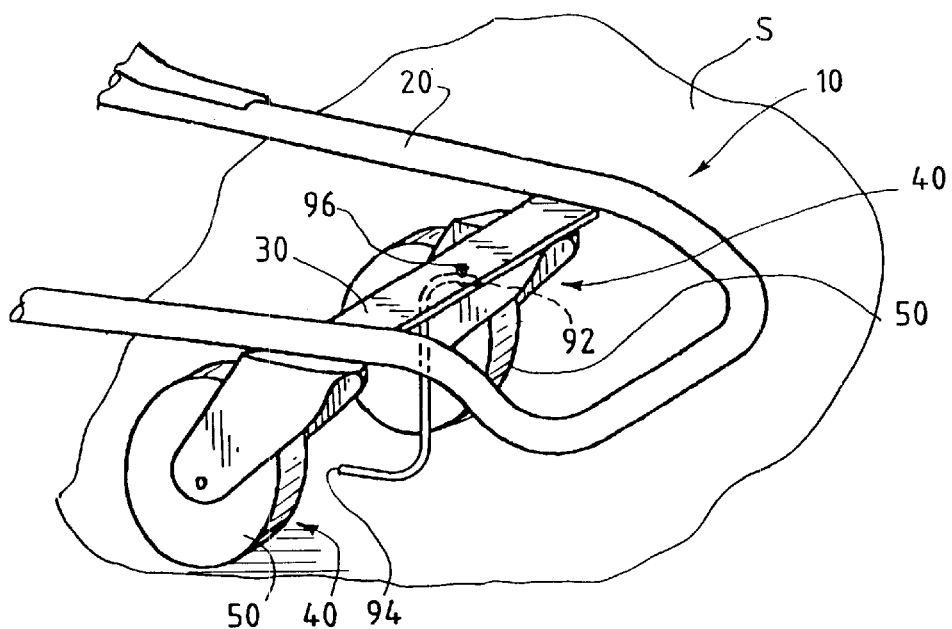
FIG. 1 is a simplified, fragmentary, perspective view showing a wheeled chassis of a shopping cart, two front casters, each having a wheel, and, as provided by this invention, an elongate, flexible, non-metallic, static-dissipative, tubular member.
Figure 2:
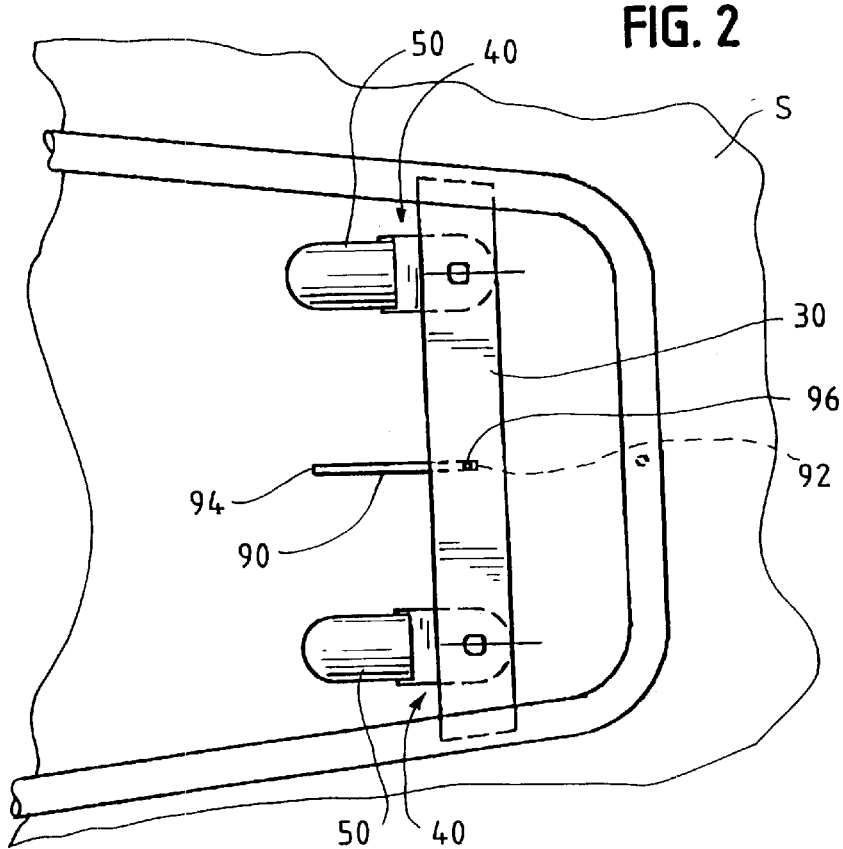
FIG. 2 is a simplified, plan view of what is shown in FIG. 1.

As shown in FIG. 1 and 2, a shopping cart 10 has a steel chassis 20, to which a steel handle (not shown) and a steel or plastic basket (not shown) are mounted fixedly in a known manner, a caster plate 30, which is made of steel and which is mounted fixedly to the steel chassis 20 in a known manner, and two front casters 40, each having a wheel 50 and an axle 60 mounting the wheel 50 rotatably and each having steel components except for the wheel 50, which has a non-metallic, surface-engaging tire 52. The rear wheels have similar tires.

The wheels 50 and two rear wheels (not shown) support the steel chassis 20, the handle, and the basket above a supporting surface S, such as a finished surface of a vinyl, wooden, or laminated floor. As explained above, unless made from a conductive, carbon-filled, or powder metal-filled polymer, the tires 52 of the wheels 50 and the tires of the rear wheels isolate the steel chassis 20 from the supporting surface S. As explained above, even if the tires 52 of the wheels 50 and the tires of the rear wheels are made from a conductive, carbon-filled, or metal powder-filled polymer, the wheels 50 and the rear wheels, when dirty, may isolate the steel chassis 20 from the supporting surface S.

As shown in FIGS. 1 and 2, the steel chassis 20 is grounded to the supporting surface S by an elongate, flexible, non-metallic, static-dissipative, tubular member 90, which has a proximal end 92 and a distal end 94. The tubular member 90 is connected mechanically and electrically to the steel chassis 20, via the caster plate 30, to which the proximal end 92 of the elongate tubular 90 is connected, between the casters 40, via a rivet 96. The distal end 94 of the tubular member 90 is arranged to drag along the supporting surface S, when the shopping cart 10 is moved along the supporting surface S, whereby the steel chassis 20 is grounded to the supporting surface S.

Figure 3:
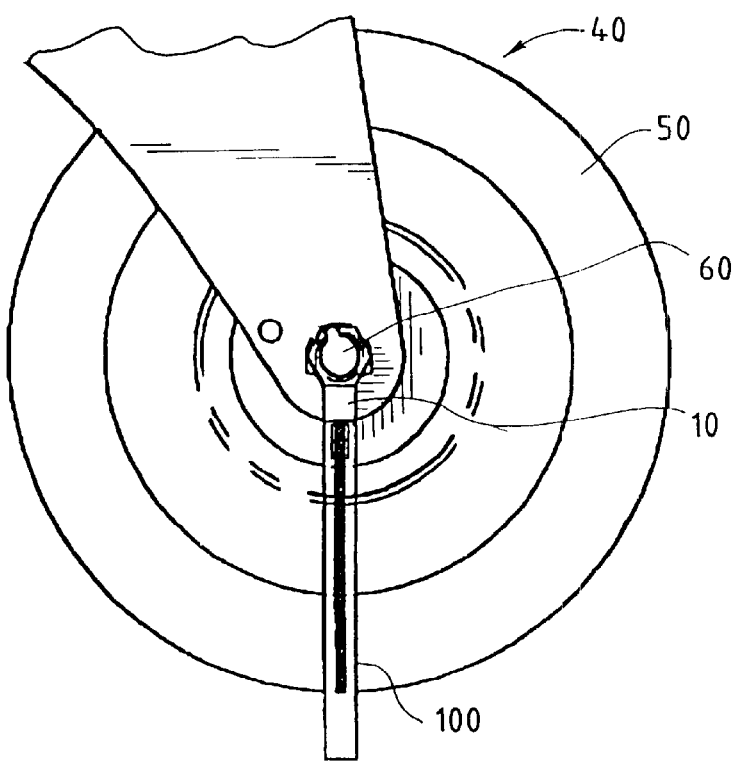
FIG. 3, on a larger scale, is a side view, partially sectioned, which shows one front caster having a wheel and having an axle for the wheel, from the shopping cart shown in FIGS. 1 and 2, and which shows, as an alternative to the tubular member shown in FIGS. 1 and 2, an elongate, flexible, non-metallic, static-dissipative, tubular member.
Figure 4:
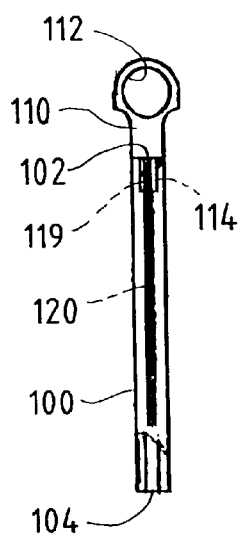
FIG. 4 is a detail taken from FIG. 3, showing the tubular member, and showing a metal connector and a metal cable, as used to mount the tubular member to the axle.

As shown in FIGS. 3 and 4, as an alternative to the tubular member 90, the steel chassis 20 is grounded to the supporting surface S by an elongate, flexible, non-metallic, static-dissipative, tubular member 100. The tubular member 100 is connected mechanically and electrically to the axle 60 of one of the casters 40, by a steel connector 110, which has an eyelet 112 encompassing the axle 60 mounting the tubular member 100 and which has a crimping end 114, and by a steel cable 120, which is flexible, which has a proximal end 122 crimped to the crimping end 114 of the steel connector 110, and over which the tubular member 100 is fitted with an interference fit. A proximal end 102 of the tubular member 100 is fitted over the crimping end 114 of the steel connector 110, with an interference fit, and a distal end 104 of the tubular member 100 extends beyond a distal end 124 of the steel cable 120. The distal end 104 of the tubular member 100 is arranged to drag along the supporting surface S, when the shopping cart 10 is moved along the supporting surface S, whereby the steel chassis 20 is grounded to the supporting surface S.

Because the tubular member 100 and the steel cable 124 are flexible, the wheel 50 having the axle 60 mounting the tubular member 100 is not damaged, if the same wheel 50 happens to roll over the tubular member 100 when the shopping cart 10 is moved.

The tubular member 90, if used, or the tubular member 100, if used, can be advantageously made from a flexible, static-dissipative, polymeric material, such as a polyvinyl chloride, which is preferred. Suitable examples of polyvinyl chlorides, which are static-dissipative, are disclosed in U.S. Pat. Nos. 4,976,890, 5,066,422, and 5,091,452, the disclosures of which are incorporated herein by reference. A suitable material is a polyvinyl chloride available commercially from Vinylex Corp. of Carrolton, Texas, under the trade designation SF85 Flex PVC with UV and fungus inhibitors.

The tubular member 90, if used, or the tubular member 100, if used, does not tend to damage the supporting surface, particularly if the supporting surface is a finished surface of a vinyl, wooden, or laminated floor. Rather that a tubular member 90, 100, a flexible strap of a similar material can be alternatively used.

What is claimed is:

1. A wheeled conveyance of a type designed to be moved by pushing, pulling, or pedaling along a supporting surface, the wheeled conveyance having a metal chassis and having wheels, which are adapted to support the metal chassis above the supporting surface and which may isolate the metal chassis electrically from the supporting surface, the metal chassis being adapted to be grounded to the supporting surface by an elongate member arranged to drag along the supporting surface when the wheeled conveyance is moved along the supporting surface, the elongate member being made from a non-metallic, static-dissipative material, at least where the elongate member drags along the supporting surface, wherein each wheel has an axle, on which said wheel is rotatable, and wherein the elongate member is mounted mechanically and electrically to the axle of one of the wheels.

2. The wheeled conveyance of claim 1 wherein the non-metallic, static-dissipative material is polymeric.

3. The wheeled conveyance of claim 2 wherein the non-metallic, static-dissipative material is a polyvinyl chloride.

4. The wheeled conveyance of claim 3 wherein the elongate member is flexible.

5. The wheeled conveyance of claim 4 wherein the elongate member is tubular.

6. A wheeled conveyance of a type designed to be manually moved, by pushing or pulling, along a supporting surface, the wheeled conveyance having a metal chassis and having wheels, which are adapted to support the metal chassis above the supporting surface and which isolate the metal chassis electrically from the supporting surface, the metal chassis being adapted to be grounded to the supporting surface by an elongate member arranged to drag along the supporting surface when the wheeled conveyance is moved along the supporting surface, the elongate member being static-dissipative, each wheel having an axle, on which said wheel is rotatable, and the elongate member being mounted mechanically and electrically to the axle of one of the wheels, wherein each wheel has an axle, on which said wheel is rotatable, and wherein the elongate member is mounted mechanically and electrically to the axle of one of the wheels.

7. The wheeled conveyance of any preceding claim wherein the wheeled conveyance is a shopping cart.

* * * * *

(12) EX PARTE REEXAMINATION CERTIFICATE (5417th)
United States Patent
O'Quin et al.

(10) Number: US 6,357,767 C1
(45) Certificate Issued: Jun. 20, 2006

(54) STATIC-DISSIPATIVE MEMBER FOR WHEELED CONVEYANCE

(75) Inventors: Taft O'Quin, Inola, OK (US); Leslee Bottoms, Wagoner, OK (US)

(73) Assignee: Unarco Industries, Inc., Wagoner, OK (US)

Reexamination Request:
No. 90/006,653, May 29, 2003

Reexamination Certificate for:
Patent No.: 6,357,767
Issued: Mar. 19, 2002
Appl. No.: 09/685,707
Filed: Oct. 10, 2000

(51) Int. Cl.
*B62B 5/00* (2006.01)

(52) U.S. Cl. .................. 280/79.11; 361/217; 361/219; 361/222

(58) Field of Classification Search .............. 280/79.11, 280/79.2, 79.3, 33.991, 33.992; 361/222, 361/220, 219, 216, 223; 16/18 R, 47, 48, 16/37, 38; 37/37, 38; 175/264; 317/2
See application file for complete search history.

(56) References Cited

U.S. PATENT DOCUMENTS

| 608,234 | A | * | 8/1898 | Slayton ................ 174/138 R |
|---|---|---|---|---|
| 619,896 | A | * | 2/1899 | Lee ..................... 174/138 R |
| 907,104 | A | * | 12/1908 | Brower .................. 361/219 |
| 1,999,414 | A | | 4/1935 | King |
| 2,084,523 | A | * | 6/1937 | Crawford ................ 361/221 |
| 2,216,363 | A | * | 10/1940 | Crawford ................ 361/221 |
| 2,280,327 | A | * | 4/1942 | Ware .................... 361/219 |
| 2,318,340 | A | * | 5/1943 | Thacher et al. ........... 361/219 |
| 2,521,337 | A | * | 9/1950 | Brummer ................ 361/219 |
| 2,524,163 | A | * | 10/1950 | Criss .................... 361/219 |
| 2,533,403 | A | * | 12/1950 | Schultz ..................... 174/6 |
| 2,549,471 | A | * | 4/1951 | Hutchison ............... 361/219 |
| 2,728,032 | A | * | 12/1955 | Foltz .................... 361/222 |
| 2,753,491 | A | * | 7/1956 | Legge ................... 361/219 |
| 2,985,799 | A | * | 5/1961 | Steele ................... 361/219 |
| 4,321,653 | A | * | 3/1982 | Takahashi ............... 361/219 |
| 4,374,760 | A | * | 2/1983 | Charles ................ 252/519.21 |
| 4,763,383 | A | * | 8/1988 | Estkowski et al. ......... 16/18 R |
| 4,807,328 | A | * | 2/1989 | Hezel ...................... 16/47 |
| 4,934,022 | A | * | 6/1990 | Lissner .................. 16/18 R |
| 6,327,131 | B1 | * | 12/2001 | Thomas et al. ........... 361/212 |

\* cited by examiner

*Primary Examiner*—J. Allen Shriver

(57) ABSTRACT

A wheeled conveyance, such as a shopping cart, a luggage cart, a utility cart, a wheel chair, a gurney, or a tricycle has a metal chassis and wheels, which support the metal chassis above a supporting surface, such as a floor surface, and which may isolate the metal chassis electrically from the supporting surface. The metal chassis is grounded to the supporting surface by an elongate, flexible member, which is made from a non-metallic, static-dissipative material, such as a polyvinyl chloride, and which is arranged to drag along the supporting surface when the wheeled conveyance is moved along the supporting surface. Each wheel has an axle, on which such wheel is rotatable, and the elongate member can be mechanically and electrically connected to the axle of one of the wheels.

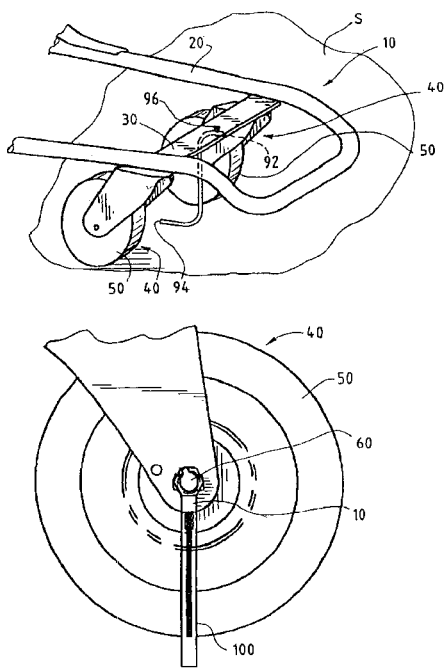

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claim 1 is determined to be patentable as amended.

Claims 2–5 and 7, dependent on an amended claim, are determined to be patentable.

New claims 8 and 9 are added and determined to be patentable.

1. A wheeled conveyance of a type designed to be moved by pushing *manually*, pulling *manually*, or pedaling along a supporting surface, the wheeled conveyance having a metal chassis and having wheels, which are adapted to support the metal chassis above the supporting surface and which may isolate the metal chassis electrically from the supporting surface, *each wheel having an axle, on which said wheel is rotatable*, the metal chassis being adapted to be grounded to the supporting surface by an elongate member arranged to drag along the supporting surface [when the wheeled conveyance is moved along the supporting surface], the elongate member being *mounted mechanically and electrically to the axle of one of the wheels, at one end of the elongate member, and being* made from a non-metallic, static-dissipative material, at least where the elongate member drags along the supporting surface [, wherein each wheel has an axle, on which said wheel is rotatable, and wherein the elongate member is mounted mechanically and electrically to the axle of one of the wheels] *up to the end where the elongate member is mounted mechanically and electrically to the axle of one of the wheels, wherein the axle mounting the elongate member is supported by a yoke having downwardly depending legs, between which the wheel rotatable on the axle mounting the elongate member is rotatable, and wherein the elongate member is mounted outside the yoke, at one end of the axle mounting the elongate member.*

*8. A wheeled conveyance of a type designed to be manually moved, by pushing or pulling, along a supporting surface, the wheeled conveyance having a metal chassis and having wheels, which are adapted to support the metal chassis above the supporting surface and which may isolate the metal chassis electrically from the supporting surface, each wheel having an axle, on which said wheel is rotatable, the metal chassis being adapted to be grounded to the supporting surface by an elongate member arranged to drag along the supporting surface when the wheeled conveyance is moved along the supporting surface, the elongate member being mounted mechanically and electrically to the axle of one of the wheels, at one end of the elongate member, and being made from a flexible, static-dissipative material, at least where the elongate member drags along the supporting surface up to the end where the elongate member is mounted mechanically and electrically to the axle of one of the wheels, wherein the axle mounting the elongate member is supported by a yoke having downwardly depending legs, between which the wheel rotatable on the axle mounting the elongate member is rotatable, and wherein the elongate member is mounted outside the yoke, at one end of the axle mounting the elongate member.*

*9. The wheeled conveyance of claim 8 wherein the wheeled conveyance is a shopping cart.*

\* \* \* \* \*